United States Patent
Tarfaoui

(10) Patent No.: US 11,787,886 B2
(45) Date of Patent: Oct. 17, 2023

(54) SINGLE STEP FOAMED POLYMERIC MATERIAL CHARACTERISED BY THE PRESENCE OF TWO OR MORE CELLULAR LAYERS AND AGGREGATES THAT EXHIBIT VARIATION IN CELL SIZE AND CELL DENSITY DISTRIBUTION

(71) Applicant: Ahmed Ben Amor Tarfaoui, Houston, TX (US)

(72) Inventor: Ahmed Ben Amor Tarfaoui, Houston, TX (US)

( * ) Notice: Subject to any disclaimer, the term of this patent is extended or adjusted under 35 U.S.C. 154(b) by 340 days.

(21) Appl. No.: 17/071,559

(22) Filed: Oct. 15, 2020

(65) Prior Publication Data
US 2022/0119565 A1 Apr. 21, 2022

(51) Int. Cl.
C08J 9/14 (2006.01)
C08F 212/10 (2006.01)
C08J 9/04 (2006.01)

(52) U.S. Cl.
CPC .............. C08F 212/10 (2013.01); C08J 9/04 (2013.01); *C08J 2325/12* (2013.01)

(58) Field of Classification Search
CPC ........ C08F 212/10; C08J 9/04; C08J 2325/12; C08J 2203/12; C08J 2203/14; C08J 2203/182; C08J 9/141; C08J 9/142; C08J 9/149
See application file for complete search history.

(56) References Cited

U.S. PATENT DOCUMENTS

2015/0374560 A1* 12/2015 Hubbard, Jr. ........... A61L 15/60
428/316.6
2020/0190345 A1* 6/2020 Mabe ..................... B33Y 10/00

FOREIGN PATENT DOCUMENTS

CA 2825836 A1 * 8/2012 ............. B29C 44/12

* cited by examiner

*Primary Examiner* — K. Boyle

(57) ABSTRACT

The present invention relates to a process for the manufacture of foamed polymeric material characterised by the presence of two or more cellular layers and aggregates that exhibit variations in cell size and cell density distribution. The heterogeneous polymeric material is foamed using a single expansion step, thus eliminating the assembly steps and improving the mechanical proprieties of the foam. The invention allows producing custom foam with predefined profiles of cell size, cell density distribution, and with correlated variations of its physical properties. The key to this invention is that the polymer material before expansion is made in multiple polymerisation steps from the original monomers. In each polymerisation step, a different recipe of monomers and physical blowing agents' concentration is used. These recipes within the final polymer material will expand under the same temperature to produce various aggregates of cell sizes and cell distribution in the final foam.

6 Claims, 3 Drawing Sheets

Figure 1:
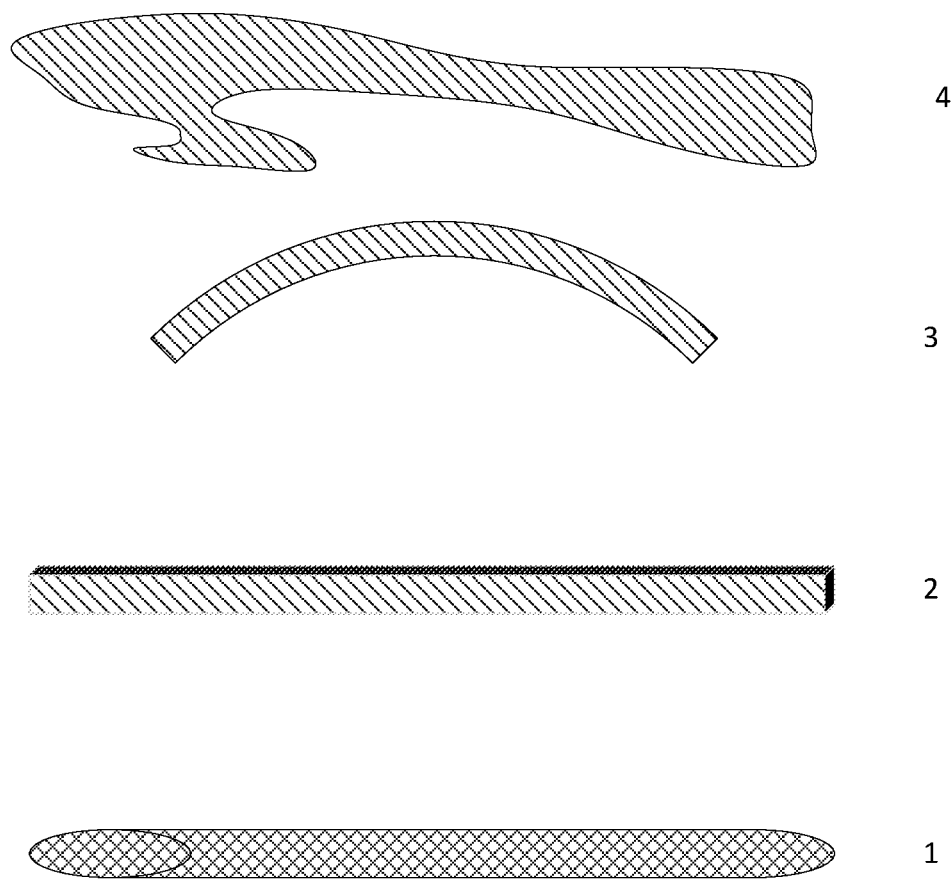

SINGLE STEP FOAMED POLYMERIC MATERIAL CHARACTERISED BY THE PRESENCE OF TWO OR MORE CELLULAR LAYERS AND AGGREGATES THAT EXHIBIT VARIATION IN CELL SIZE AND CELL DENSITY DISTRIBUTION

BACKGROUND OF THE INVENTION

1. Field of the Invention

The present invention relates to a process for the manufacturing of foamed polymeric materials characterised by the presence of two or more cellular layers and cellular aggregates like ribs within the bulk material that exhibit variation in cell size and cell density distribution. The aggregates can be continuous layers or discontinuous regions within the final foam material. The layout of these aggregates or layers is controlled and reflects the wish of the material designer.

2. Description of the Related Art

Multilayered foamed polymeric materials exhibit cell size variation across layers. U.S. Pat. No. 8,877,331 to Nadella et al. (issued Nov. 4, 2014) gives a great summary of the processes and applications of Microcellular foams to date. These foams start with one polymeric block of a single recipe and apply the diffusion of a gas called blowing agent under pressure. Later, heat is applied as the pressure is lowered followed by a cooling cycle, and a multilayered foam block is obtained. The cell size achieved is diffusion dependent i.e the cell size of the inner layers is different than the outer layers of the foam based on the diffusion rate of the absorbed gas. Also, there is no control over the cell variation profile and no particular pre-designed pattern is achieved.

U.S. Pat. No. 10,668,689 claims that multilayers of thermoplastic elastomer (TPE) stacked on top of each other and foamed under a hot press adhered to each other without adhesive due to the specific formulation. The referenced patent does not provide for aggregates within a continuum of foam. Also, the adjacent layers have limited peeling strength and they are attached to one another due to the adhesive ingredients in the formulation.

SUMMARY OF THE INVENTION

The present invention provides a novel process for manufacture of heterogeneous foam material with pre-determined cell size, cell distribution and density profile that includes rib like aggregates. The heterogeneous foam balances mechanical resistance with light weight in a more efficient way, for any given set of polymer systems. The heterogeneous foam is obtained in a single foaming step, thus eliminating the need for any assembly steps such as insertion or adhesion and improving the mechanical proprieties of the foam. The ability to design foam materials with predefined layout of aggregates like ribs is very useful for the construction of dynamic structures that requires light and strong materials customised to variable dynamic forces that obey a particular profile along a specific direction or within a region.

In one embodiment of the present invention, the rib like aggregates are made initially from their respective recipe of monomers that are polymerised in their specific custom mould.

In a second embodiment the ribs are brought together in a final mould, and a final recipe of monomers is pored over the ribs to form the final envelope around them.

In a third embodiment the final polymeric block is expanded in one single foaming step to form the final heterogeneous foam material characterised by the presence of two or more layers or aggregates that are next to each other and foamed. The variation in cell size of these layers or aggregates will also obey a single thermal equilibrium and result in small variations within a single phase and a continuum between phases. This thermal equilibrium is optimized when the adjacent recipes for different layers or rib like aggregates are well balanced.

BRIEF DESCRIPTION OF THE INVENTION

The invention relates to a foam process using well balanced recipes to achieve structurally designed foam block with various aggregates of cell sizes and cell distribution and density profiles in a single foaming step, thus eliminating the need for assembly of any foam parts and improving the mechanical proprieties of the foam. The present invention provides controllability to the variation in cell size and cell distribution within each layer and in any direction and in pre-determined manner by the article's designer.

FIG. 1 is an illustration of polymeric ribs 1 to 4 or aggregates that are prepared from the polymerisation of their initial recipe of monomers, catalyst, physical and chemical blowing agents, colorant and additives. Any desired shape can be achieved by poring its respective recipe of monomers in its designed mold and allowing it to polymerise in accordance with an embodiment of this invention.

Figure 2:
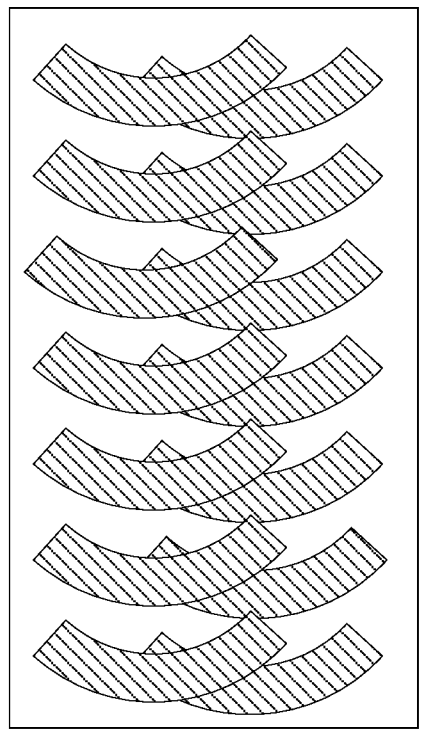
Figure 2:
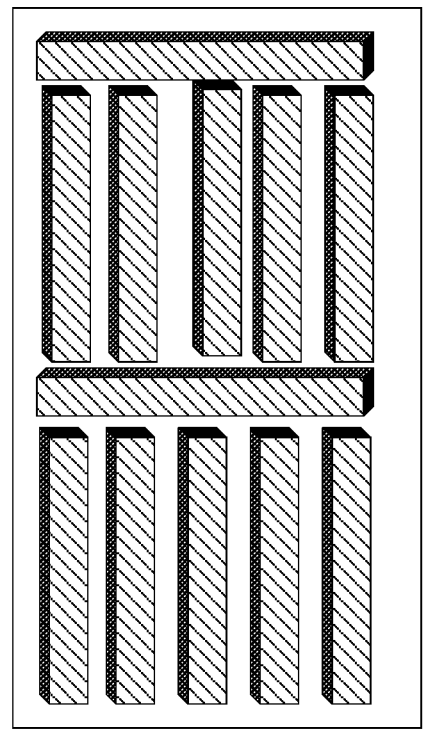
Figure 2:
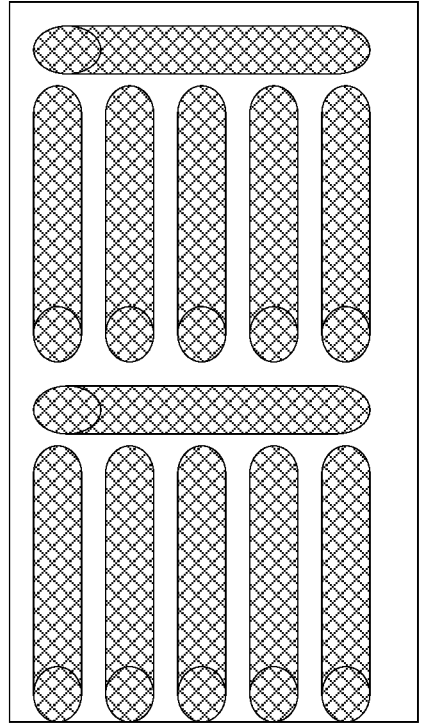
Figure 2:
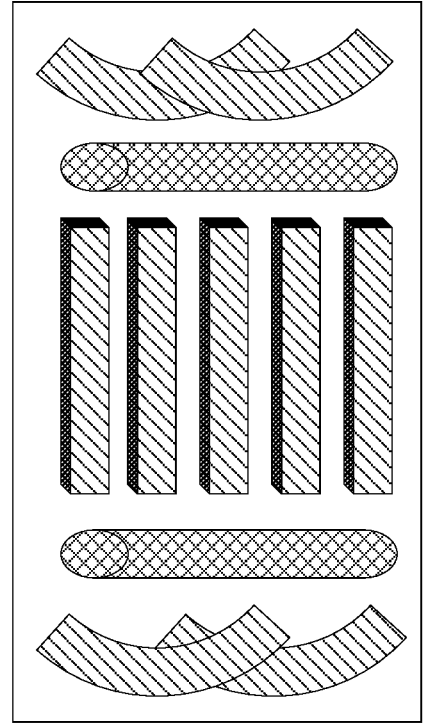

FIG. 2 is an illustration of possible arrangements 1 to 4 of the polymeric ribs or aggregates in a mold where a final recipe of monomers, catalyst, physical and chemical blowing agents, colorant and additives, is pored over the polymeric ribs and allowed to polymerize and envelope the ribs within a continuum of polymeric material. Any possible arrangement of the said ribs in any shaped final mold of the said envelope is in accordance with an embodiment of this invention.

Figure 3:
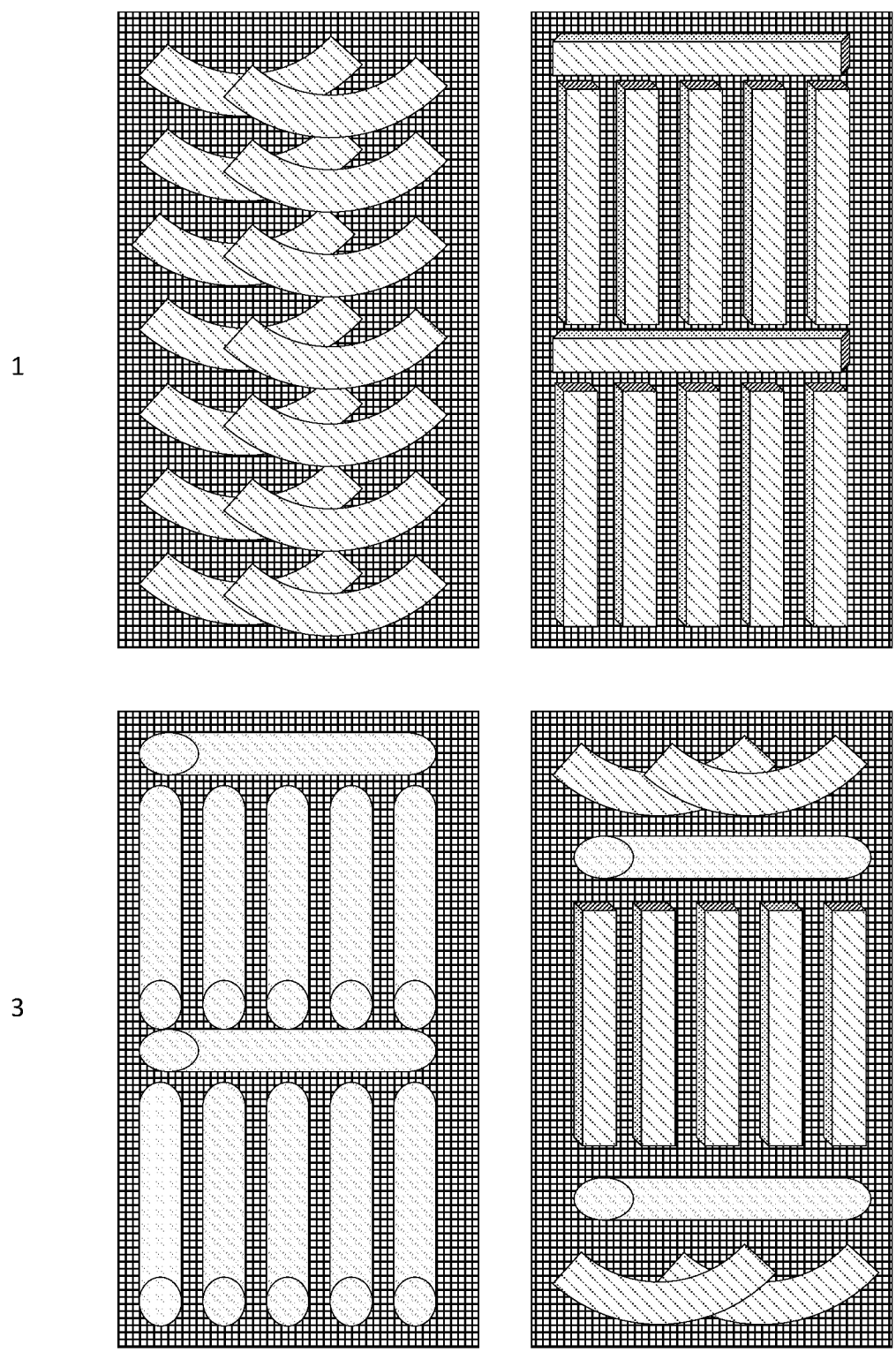

FIG. 3 gives is an illustration of the final resulting blocks of foam 1 to 4, after placing each of the polymeric blocks of FIG. 2 in an oven and allowing it to expand under a specific expansion cycle of temperature. The said expansion under an expansion cycle is in accordance with an embodiment of this invention.

The recipes of the said ribs or aggregates are similar to that of the enveloping polymer and expand with similar expansion coefficient in each direction. Recipes of polymeric systems from their respective monomers are unique in their capacity to provide for thermal equilibrium and continuity between phases during expansion. Such well balanced recipes will depend on the desired profile of cell size variation, cell distribution and density variation. Application of unique and well-balanced recipes is provided as an embodiment. The present invention covers the process claims in general as they can be applied to a multitude of foam types and recipes of polymeric materials thereof.

DETAILED DESCRIPTION OF THIS INVENTION

The present invention is focused on a process for the manufacture of heterogeneous foamed polymeric materials having aggregates like ribs within the bulk foam material and exhibit variation in cell size and cell density distribution.

The aggregates can be continuous layers or discontinuous regions within the final foam material.

The layout of these aggregates or layers is controlled and reflects the wish of the material designer. In the disclosed embodiments of the present invention, the heterogeneous polymeric block transformed to a foam in a single foaming step, is made of multiple recipes of rib like aggregates and a final polymeric envelope from a yet another distinct recipe.

The embodiments of the invention in which an exclusive propriety or privilege is claimed are presented below:

1. A process by which a single block of foam with multiple layers or embedded ribs is prepared by multiple polymerisation steps of different recipes and a single foaming step of the resulting polymer block. The number of polymerisation steps needed in process as defined, are n steps where n is higher or equal to 2. The polymerisation steps labelled 1 to n−1 are separate and independent and use different recipes of monomers that are mixed and pored in different moulds to prepare different layers or ribs of polymeric systems from their original monomers. These ribs can have any shape based on the design of their moulds. This embodiment is illustrated by FIG. 1 by elements 1 to 4.

As an embodiment, a general formula for recipes 1 to n is given for Styrene Acrylonitrile (SAN) system as:
  a. Styrene (20-60 wt. %), Acrylonitrile (10-35 wt. %), Toluene Diisocyanate TDI/Methyl Diphenyl Diisocyanate MDI (1-10 wt. %), Maleic Anhydride (0-15 wt. %), Hexane (1-5 wt. %), Acetone (1-5 wt. %), N,N-dimethyl-para-toluidine (0.5-2 wt. %), Trimethyl-propane Tri-acrylate (0-2 wt. %), Benzoyl Peroxide (0.1-0.6 wt. %), Tetra-bromo-bisphenol A (8-12 wt. %), Colorant (0-0.2 wt. %), 2. The prepared layers and ribs of embodiment 1 are brought together according to a specific design in a rectangular, cylindrical or uniquely designed mould. The final polymerisation step of embodiment 1 labelled the n step and corresponding with n recipe of its monomers, is pored on the layers and ribs therein. This polymerisation step envelope all the layers and ribs and form the final polymer block. This embodiment is illustrated by FIG. 2 by elements 1 to 4.

3. The final polymer block of Embodiment 2 is placed in an oven and exposed to a temperature cycle called the expansion cycle. The said layers and/or ribs and said envelope of the polymer block of embodiment 2, expand to form the final block of foam. This embodiment is illustrated by FIG. 3 by elements 1 to 4.

4. The said layers and/or ribs and said envelope of the polymer block of embodiment 2, expand at different expansion rates because the recipes 1 to n are different. The expansion rates of recipes 1 to n are different because:
  a. the recipes 1 to n are made of different concentrations of base monomers such as but not limited to styrene, acrylonitrile, Toluene diisocyanate, maleic anhydride.
  b. the recipes 1 to n have different concentration of polymerisation catalyst, promoters, chemical blowing agent(s), physical blowing agent(s), density regulators, colorants and additives. These are illustrated by the general recipe given in embodiment 1.
  c. the recipes 1 to n have followed different polymerisation temperature cycles and history.

5. The expansion rates of recipes 1 to n are not very different so to avoid macro deformation within the final foam block. The expansion rates of recipes 1 to n are not very different because the recipes 1 to n are well balanced and belong to one family of polymer systems, such as but not limited to Styrene Acrylonitrile (SAN) family as illustrated by the general recipe of embodiment 1. When this recipe is used:
  a. all ingredients are mixed together at room temperature according to embodiment 1, and preferably at a temperature between 10° C. and 15° C.
  b. The mixtures for each recipe 1 to n−1 are pored in their moulds according to embodiment 1, and maintained at a temperature between 10 and 20° C. and preferably between 10° C. and 15° C. depending on the thickness of each corresponding mould.
  c. The mixtures of recipe 1 to n−1 are kept in the said moulds for at least 18 hrs, and for most 30 hrs or until the mixture harden.
  d. The mixture for recipe n is pored in its mould according to embodiment 2 and maintained at a temperature between 10° C. and 20° C. and preferably between 10° C. and 15° C. depending on the thickness of the mould
  e. The final polymer block made according to embodiment 2 is then treated at 45° C. to 55° C. for 4 to 7 hrs.
  f. The final block is expanded at a temperature cycle according to embodiment 3 with ramps between 90° C. and 155° C. The ramps include a heating ramp until 120° C. and a linear ramp until 155° C., a constant expansion for 1.5 hrs to 2.5 hrs and a cooling back to 90° C.
  g. The final foam block can be thermoformed, sanded, and sliced, as known to foam industry.

6. The final block of foam made out of SAN polymer system and using the general formula of embodiment 1, has a variation in cell size that can range from (50 to 400 micron). The distribution is defined by the original layout of the ribs. It also exhibits variation in its physical properties such as density (60-320 kg/m$^3$), compression strength (1-10 MPa), shear strength (1-6 MPa), shear elongation (30-70%), and application temperature (110-130° C.).

What is claimed is:

1. A process for producing a continuous polymer foam block having multiple ribs embedded within the continuous polymer foam block, the multiple ribs exhibiting cell size variations and cell density variations according to a predefined profile, wherein the process comprises multiple polymerization steps of different recipes of monomers to make the multiple ribs, and wherein the process further comprises an additional polymerization step to embed the multiple ribs within a continuous polymer block, and wherein the continuous polymer block with embedded multiple ribs is foamed in a single foaming step and wherein the cell size variations of the multiple ribs obey a single thermal equilibrium due to the single foaming step and result in a continuum between the ribs and the continuous polymer foam block.

2. The process according to claim 1, wherein the process comprises n polymerisation steps, where n is greater or equal to 2, wherein the total number of multiple polymerization steps are equal to n−1 and wherein the nth step forms the continuous polymer block.

3. The process according to claim 1, wherein the recipe of monomers for each rib and for the continuous polymer block comprises: a) 20-60 wt. % Styrene, b) 10 to 35 wt. % Acrylonitrile, c) 1-10 wt. % of a mixture of Toluene Diisocyanate TDI/Methyl Diphenyl Diisocyanate MDI, d) 0 to 15 wt. % Maleic Anhydride, e) 1-5 wt. % Hexane, f) 1-5 wt. % Acetone, g) 0.5-2 wt. % N, N-dimethyl-para-toluidine, h) 0-2 wt % Trimethyl-propane Tri-acrylate, i) 0.1-0.6 wt. % Benzoyl Peroxide, j) 8-12 wt. % Tetra-bromo-bisphenol A, and k) 0-0.2 wt. % Colorant.

4. The process according to claim 1, wherein each of the multiple polymerisation steps comprises mixing a recipe of monomers to form a mixture and pouring the mixture into a mold and maintaining the mixture in the mold at a temperature between 10 and 15° C. for at least 18 hrs or until the mixture harden and forms the multiple ribs.

5. The process according to claim 1, wherein the multiple ribs are brought together in a mold according to a predetermined profile, and wherein a mixture of a recipe of monomers is poured over the ribs to form a continuous polymer block, and wherein the mixture is maintained at a temperature between 15 and 20° C. for at least 18 hrs or until the mixture hardens to form the continuous polymer block.

6. The process according to claim 1, wherein in the single foaming step, the continuous polymer block is a) heat treated at a temperature of 45° C. to 55° C. for 4 to 7 hrs; b) expanded at a temperature cycle with ramps from 90° C. to 155° C. for 1.5 hrs to 2.5 hrs, where in the ramps include a heating ramp from 90° C. to 120° C. and a linear heating ramp from 120° C. to 155° C. and then c) cooled to 90° C. to give the continuous polymer foam block, and wherein the continuous polymer foam block is thermoformed, sanded and sliced.

\* \* \* \* \*